Feb. 2, 1954

L. A. BIXBY 2,667,955

SYNCHRONIZER

Filed July 22, 1950

INVENTOR.
LEO A. BIXBY
BY
ATTYS.

Feb. 2, 1954 L. A. BIXBY 2,667,955
SYNCHRONIZER
Filed July 22, 1950 2 Sheets-Sheet 2

INVENTOR.
LEO A. BIXBY
BY
ATTYS.

Patented Feb. 2, 1954

2,667,955

UNITED STATES PATENT OFFICE 2,667,955

SYNCHRONIZER

Leo A. Bixby, Niles, Mich., assignor to Clark Equipment Company, Buchanan, Mich., a corporation of Michigan Application July 22, 1950, Serial No. 175,365

6 Claims. (Cl. 192—53)

1

My present invention relates to a clutch and synchronizer assembly for clutching either of a pair of gears to a shift on which the gears are rotatably mounted.

In the form of clutch synchronizer assembly to which my invention is applicable, an axially slidable clutch collar member is mounted on a splined portion of a shaft on which a pair of axially spaced gears are rotatably mounted. The clutch collar member is provided with jaw clutch teeth which are adapted to be disposed in engagement with jaw clutch teeth formed on the rotatable gears for positively clutching either one of the gears to the shaft. The clutch collar member is formed with a radially extending flange having a plurality of circumferentially spaced openings formed therethrough, which openings extend parallel to the shaft. Disposed through the openings in the flange of the clutch collar member are pins which are fixed at their ends in synchronizer rings which are adapted to cooperate with the aforementioned gears. The pins have reduced central portions which define shoulders that are adapted to cooperate with the edges defining the openings in the flange of the clutch collar member, for blocking relative axial movement of the latter with respect to the synchronizer rings when they are rotating asynchronously.

It is an object of my present invention to provide spring loaded means between the synchronizer rings and the clutch collar member, which, upon initial axial movement of the latter, will cause axial movement of the synchronizer rings therewith so as to dispose one of the synchronizer rings into clutching engagement with the adjacent gear and, after synchronous speed is reached between the gear and clutch collar member, will effect, upon further axial movement of the clutch collar member, snap engagement of the jaw clutch teeth of the clutch collar member with the jaw clutch teeth of the gear.

In the preferred form of my present invention I contemplate the provision of a plurality of additional openings in the flange of the clutch collar member, circumferentially spaced from the aforedescribed openings, and in which former openings are disposed longitudinally split pin assemblies which are received at their ends in recesses formed in the synchronizer rings. The split pin assemblies are formed with central annular grooves which are biased into engagement with the peripheries of the openings in the flange of the clutch collar member by resilient means disposed between the portions of each pin

2 assembly. Upon initial axial movement of the clutch collar member, the synchronizer rings are caused to move conjointly therewith by the split pin assemblies. After one of the synchronizer rings has been disposed in clutching engagement with the adjacent gear and synchronous speed is attained between the gear and the clutch collar member, further axial movement of the clutch collar member will cause the portions of the split pin assemblies to compress or collapse, which cocks the latter and effects snap engagement of the jaw clutch teeth of the clutch collar member with the jaw clutch teeth of the gear.

Now, in order to acquaint those skilled in the art with the manner of constructing and using devices in accordance with the principles of my present invention, I shall describe, in connection with the accompanying drawings, a preferred embodiment of my invention.

Figure 6:
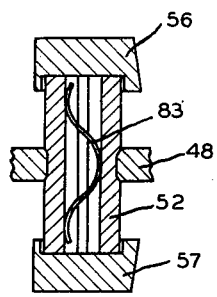
Figure 3:
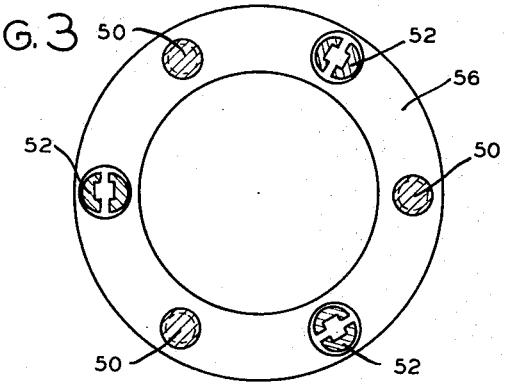
Figure 3 is a vertical sectional view taken along the line 3—3 of Figure 2, looking in the direction indicated by the arrows, showing one of the synchronizer rings.
Figure 7:
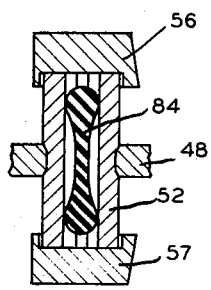
Figure 4:
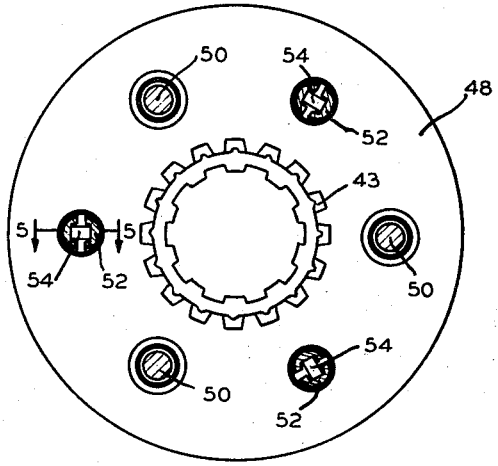
Figure 4 is a vertical sectional view taken along the line 4—4 of Figure 2, looking in the direction indicated by the arrows, showing the clutch collar member.
Figure 5:
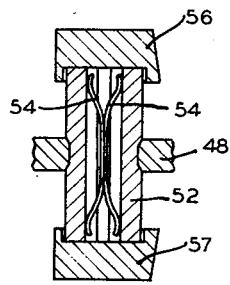
Figure 5 is a horizontal sectional view taken along the line 5—5 of Figure 4, looking in the direction indicated by the arrows, showing a substantially X-shaped spring metal clip member disposed between the portions of the split pin assembly.
Figure 2:
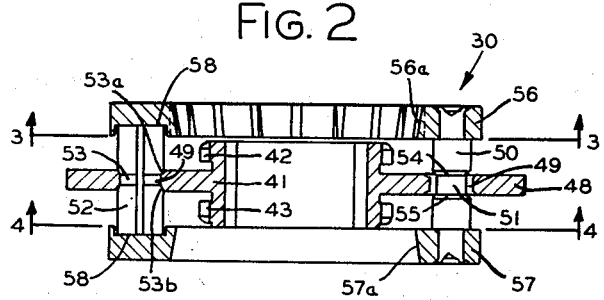
Figure 2 is a horizontal sectional view taken through the clutch and synchronizer assembly of my present invention.

Figure 6 is a horizontal sectional view similar to Figure 5, but showing a modified form of my invention in which a substantially serpentine-shaped spring metal clip member is disposed between the portions of the split pin assembly; and, Figure 7 is a horizontal sectional view similar to Figures 5 and 6, but showing another modified form of my invention in which a substantially dumbbell-shaped resilient member is disposed between the portions of the split pin assembly.

Referring now to the drawings, there is shown a transmission construction, indicated generally by the reference numeral 10, which comprises a transmission housing 11, to which, at the upper portion thereof, is suitably secured a cover member 12. A horizontally extending drive shaft 13 is journaled in a bearing assembly 14, supported in the transmission housing 11, and the drive shaft 13 has an enlarged gear portion 15 formed at one end thereof within the transmission housing 11. One end of a horizontally extending output shaft 16 is journaled inwardly of the drive shaft 13 by means of a plurality of roller or needle bearings 16. The other end of the output shaft 16 is journaled within a ball bearing assembly 18, supported in the transmission housing 11. Disposed below the output shaft 16 is a countershaft 19 which is journaled at its ends within a roller bearing assembly 20 and a ball bearing assembly 21, supported in the transmission housing 11.

The enlarged gear portion 15 of the drive shaft 13 is disposed in meshing engagement with a gear 22 keyed to the countershaft 19. Rotatably mounted on the output shaft 16 are gears 23, 24, and 25, which respectively have meshing engagement with gears 26 and 27 keyed to the output shaft 19, and gear portion 28, formed integrally with the output shaft 19. Disposed concentrically about the output shaft 16, intermediate of the enlarged gear portion 15 and the rotatable gear 23, is one clutch and synchronizer assembly of my present invention, indicated generally by the reference numeral 30. A second clutch and synchronizer assembly, indicated generally by the reference numeral 31, like the clutch and synchronizer assembly 30, is disposed concentrically about the output shaft 16, intermediate of the rotatable gears 24 and 25.

The clutch portion of the clutch and synchronizer assembly 30 comprises a clutch collar member 41 suitably mounted to the output shaft 16 for rotation therewith and adapted for axial movement therealong. The clutch collar member 41 has two sets of external jaw clutch teeth 42 and 43 which are adapted, respectively, to be selectively disposed in engagement with internal jaw clutch teeth 44 and 45, formed integrally with axially extending annular flange portions 46 and 47 of the enlarged gear portion 15 and the rotatable gear 23, which flange portions 46 and 47 face the clutch collar member 41.

The clutch collar member 41 is provided with a radially extending flange portion 48 having a plurality of circumferentially spaced openings 49 formed therethrough, which openings 49 extend parallel to the axis of shaft 16. The edges of the openings 49 are countersunk. Disposed through alternate openings 49 in the flange portion 48 of the clutch collar member 41 are pin members 50 having central annular grooves 51 and tapered blocking shoulders 54 and 55 formed therein. Disposed through the other alternate openings 49, formed in the flange portion 48 of the clutch collar member 41, are split pin assemblies 52 having central annular grooves 53 and tapered shoulders 53a and 53b formed therein. The split pin assemblies 52 preferably comprise semicylindrical segments, between which segments are preferably disposed substantially X-shaped spring metal clip members 54, as shown in Figure 5. The members 54 are adapted to bias the semicylindrical portions of the split pin assemblies 52 apart and normally urge the central annular grooves 53 thereof into engagement with the inner peripheral surfaces of the adjacent openings 49 formed in the flange portion 48.

The pin members 50 have reduced end portions which are rigidly secured, as by riveting, within openings formed in a pair of axially spaced synchronizer ring members 56 and 57, which are formed with internal tapered friction surfaces 56a and 57a adapted to cooperate, respectively, with external tapered friction surfaces 46a and 47a formed on the axially extending annular flange portions 46 and 47 of the enlarged gear portion 15 and rotatable gear 23. Suitable circumferentially spaced recesses 58 are formed in the facing surfaces of the synchronizer ring members 56 and 57, which recesses 58 receive the ends of the split pin assemblies 52.

The clutch and synchronizer assembly 31 is identical in construction and operation to the clutch and synchronizer assembly 30. The assembly 31 comprises a clutch collar member 59 which is suitably mounted to the output shaft 16 for rotation therewith and adapted for axial movement therealong. The clutch collar member 59 is formed with two sets of external jaw clutch teeth 60 and 61 which are adapted to be disposed, respectively, in engagement with jaw clutch teeth 62 and 63 formed on the axially extending annular flange portions 64 and 65 of the rotatable gears 24 and 25, which flange portions 64 and 65 face the clutch collar member 59. The clutch collar member 59 is formed with a radially extending flange portion 66, through which a plurality of circumferentially spaced openings 72 are formed, which openings 72 extend parallel to the axis of shaft 16. The edges of the openings 72 are countersunk. Disposed through alternate openings 72 in the flange portion 66 are pin members 67 having central annular grooves 68 and tapered blocking shoulders 68a and 68b formed therein. The reduced end portions of the pin members 67 are rigidly secured, as by riveting, within a pair of axially spaced synchronizer ring members 69 and 70, which have internal tapered friction surfaces 69a and 70a adapted to engage, respectively, with external tapered surfaces 64a and 65a formed on the axially extending annular flange portions 64 and 65 of gears 24 and 25. Disposed through the other alternate openings 72 formed in the flange portion 66 are split pin assemblies 71, the ends of which are received in circumferentially spaced recesses 73 formed in the facing surfaces of the synchronizer ring members 69 and 70. The split pin assemblies 71 have central annular grooves 74 and tapered shoulders 74a and 74b formed therein. The split pin assemblies 71 comprise semicyclindrical segments between which are disposed, preferably substantially X-shaped spring metal clip members which are identical to the members 54, as shown in Figure 5. The members referred to are adapted to bias the semicylindrical portions of the split pin assemblies 71 apart and normally urge the central annular grooves 74 thereof into engagement with the inner peripheral surfaces of the adjacent openings 72 formed in the flange portion 66.

Journaled for axial movement in downwardly extending bosses 75 and 76, formed integrally with the transmission cover member 12, is a shift rail 77. Secured to the shift rail 77, intermediate of the bosses 75 and 76, is a shift fork 78 which is provided for effecting axial movement of the flange portion 48 of the clutch collar member 41. Axial movement of the shift rail 77 and shift fork 78 is effected in a conventional manner by means of a shift lever 79 fulcrumed in a control tower 80 mounted on the cover member 12. Suitable detent means, indicated generally at 81, is provided for positioning the shift rail 77. A second shift rail and shift fork (not shown) are provided for effecting axial movement of the flange portion 66 of the clutch collar member 59, and are adapted to be suitably actuated by means of the shift lever 79.

Figure 1:
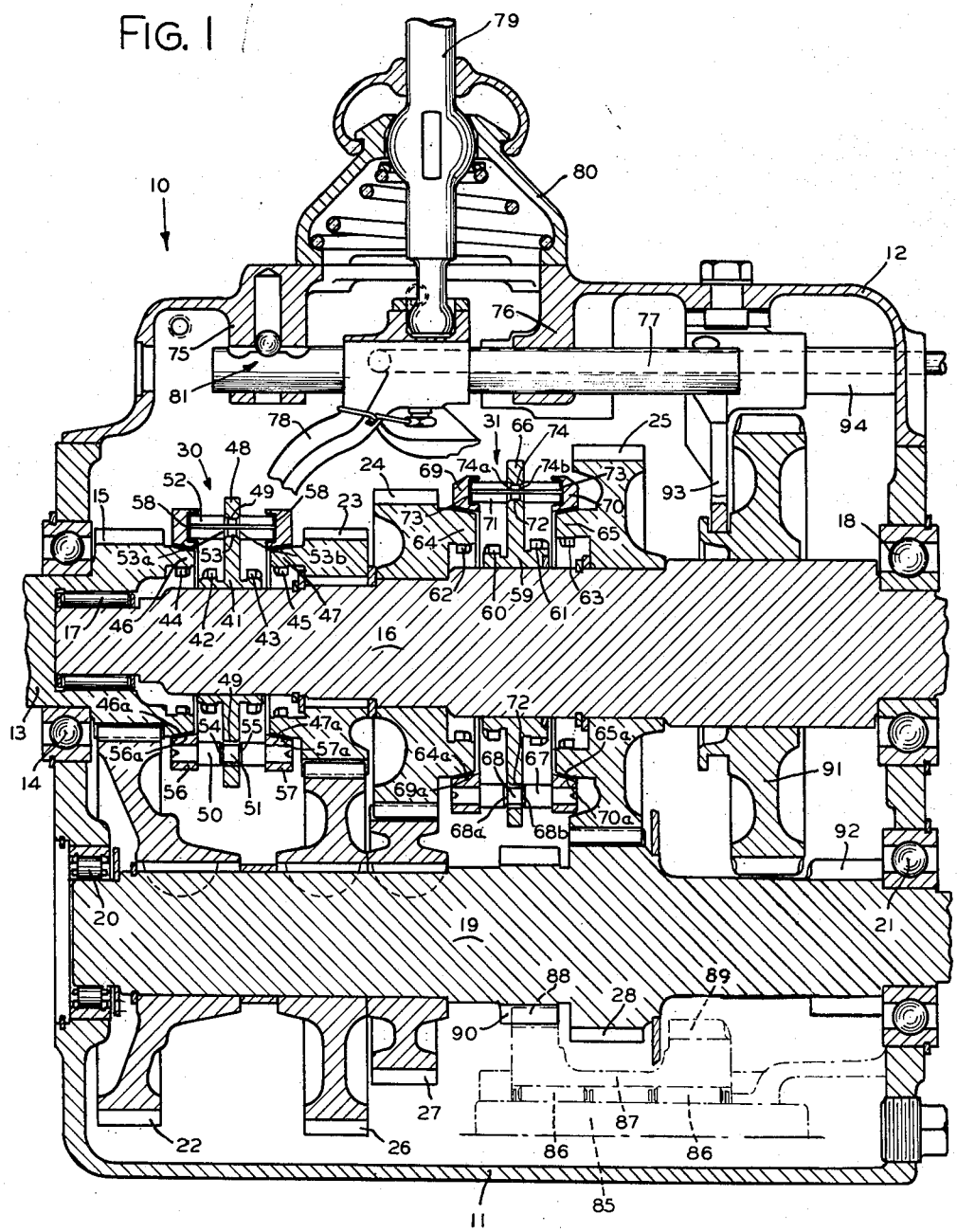
Figure 1 is a vertical sectional view taken through a transmission with which the clutch and synchronizer assembly of my present invention is incorporated.

Upon rotation of the drive shaft 13, drive may be effected to the output shaft 16 in one of four ratios. With the clutch and synchronizer assembly 31 in a neutral position, as shown in Figure 1, axial movement of the clutch collar member 41 to the left, from the position shown in Figure 1, may be effected by the control lever 79 through the shift fork 78. Initial movement of the clutch collar member 41 to the left carries the synchronizer rings 56 and 57 therewith, since the central annular grooves 53 of the split pin assemblies 52 are biased into engagement with the peripheries of the openings 49 in the flange portion 48. Further axial movement of the clutch collar member 41 to the left causes the internal tapered friction surface 56a of the synchronizer ring 56 to be disposed into frictional engagement with the external tapered friction surface 46a on the axially extending annular flange portion 46 of gear portion 15. Slip occurs during initial engagement of the tapered friction surfaces 46a and 56a, and thus the gear 15 and synchronizer ring 56 rotate asynchronously. During this initial engagement the shoulders 54 of pins 50 are disposed in blocking relation with respect to the edges of the adjacent openings 49 in the flange portion 48 which prevents axial movement of the clutch collar member 41 relative to the synchronizer rings 56 and 57. After the tapered friction surfaces 46a and 56a have been fully engaged and they rotate synchronously, the shoulders 54 on pins 51 no longer block axial movement of the clutch collar member 41 relative to the synchronizer rings 56 and 57.

Initial axial movement of the clutch collar member, relative to the synchronizer rings 56 and 57, causes the portions of the split pin assemblies 52 to compress or collapse which cocks the latter and effects snap engagement of the jaw clutch teeth 42 of the clutch collar member 41 with the jaw clutch teeth 44 on gear 15, thus providing a positive direct drive between the gear 15 and output shaft 16.

In a like manner, the clutch collar member 41 may be moved axially to the right, from the position shown in Figure 1, by the control lever 79 through the shift fork 78. Since engagement of the jaw clutch teeth 43 of the clutch collar member 41 is effected in the same manner as above described, it is believed that a detail description thereof is unnecessary. When the jaw clutch teeth 43 are disposed in engagement with the jaw clutch teeth 45, a second drive ratio is effected between the input shaft 13 and output shaft 16.

If the clutch collar member 41 is returned to a neutral position, as shown in Figure 1, the clutch and synchronizer assembly 31 may be shifted either to the left or to the right for effecting either one of two additional ratios between the drive shaft 13 and the output shaft 16. Since the operation of the clutch and synchronizer assembly 31 is identical to the operation of the synchronizer assembly 30, it is believed that the operation thereof will be apparent.

While the semicylindrical portions of the split pin assemblies 52 are preferably biased apart by means of substantially X-shaped spring metal clip members 54, a substantially serpentine-shaped spring metal clip member 83 may be utilized in a modified form of my invention, as shown in Figure 6, or a substantially dumbbell-shaped resilient member 84, as shown in Figure 7. It will be readily apparent that the constructions shown in Figures 6 and 7 may be embodied with the split pin assemblies 71.

Journaled on a lay shaft 85, shown revolved from its normal position for the sake of clarity, by means of roller or needle bearings 86, is a compound gear 87 having axially spaced gear portions 88 and 89. The gear portion 88 has meshing engagement with a gear portion 90 formed integrally with the countershaft 18. Mounted on the output shaft 16 for rotation therewith and axial movement therealong is a gear 91 which is adapted to be disposed in engagement with either the gear portion 89 of compound gear 87, for effecting reverse drive to the output shaft 16, or gear portion 92 formed integrally with the countershaft 19, for effecting another drive ratio to the output shaft 16. Axial movement of the gear 91 is effected by means of a shift fork 93 suitably fixed to an axially movable shift rail 94.

While I have shown and described what I believe to be a preferred embodiment of my present invention, it will be understood that various modifications and rearrangements may be made therein without departing from the spirit and scope of my present invention.

I claim:

1. For use in a transmission having a shaft and a gear rotatably mounted about the axis of the shaft and with the gear having jaw clutch teeth and a friction clutch element, the combination of a clutch and synchronizer assembly for selectively coupling the gear to the shaft comprising, a clutch collar member axially slidable on the shaft and mounted for rotation therewith adjacent the gear, said clutch collar member having jaw clutch teeth adapted to cooperate with the jaw clutch teeth on the gear, said clutch collar member having first and second openings formed therethrough parallel to the shaft, axially movable friction clutch elements one of which is adapted to cooperate with the friction clutch element on the gear, pins disposed through the first openings in said clutch collar member and rigidly connecting said axially movable friction clutch elements, means formed integrally with said pins for blocking axial movement of said clutch collar member relative said axially movable friction clutch elements when the latter and said clutch collar member are rotating asynchronously, longitudinally split pin assemblies disposed through the second openings in said clutch collar member, said axially movable friction clutch elements having recesses formed therein for receiving the ends of said split pin assemblies, and resilient means between the portions of said split pin assemblies for spring loading the latter upon initial axial movement of said clutch collar member relative said axially movable friction clutch elements for effecting snap engagement of the jaw clutch teeth of the clutch collar member with the jaw clutch teeth of the adjacent gear.

2. The combination of claim 1 wherein said split pin assemblies are formed with centrally located annular grooves normally adapted to be biased into engagement with the peripheries of the second openings in said clutch collar member.

3. The combination of claim 1 wherein said resilient means comprises substantially X-shaped spring metal clip members.

4. The combination of claim 1 wherein said resilient means comprises substantially dumbbell-shaped resilient bar members.

5. The combination of claim 1 wherein said resilient means comprises substantially serpentine-shaped spring metal clip members.

6. For use in a transmission having a shaft and two axially spaced gears rotatably mounted about the axis of the shaft and with the gears having jaw clutch teeth and friction clutch elements at the facing sides thereof, the combination of a clutch and synchronizer assembly for selectively coupling either of the two gears to the shaft comprising, a clutch collar member axially slidable on the shaft and mounted for rotation therewith between the gears, said clutch collar member having jaw clutch teeth adapted to cooperate with the jaw clutch teeth on the gears, said clutch collar member having openings formed therethrough parallel to the shaft, axially movable friction clutch elements adapted to cooperate with the friction clutch elements on the gears, means rigidly interconnecting said axially movable friction clutch elements, said means being adapted to block axial movement of said clutch collar member relative to said axially movable friction clutch elements when the latter and said clutch collar member are rotating asynchronously, longitudinally split pin assemblies disposed through the openings in said clutch collar member, said axially movable friction clutch elements having recesses formed therein for receiving the ends of said split pin assemblies, and resilient means between the portions of said spit pin assemblies for spring loading the latter upon initial axial movement of said clutch collar member relative said axially movable friction clutch elements for effecting snap engagement of the jaw clutch teeth of the clutch collar member with the jaw clutch teeth of the adjacent gear.

LEO A. BIXBY.

References Cited in the file of this patent

UNITED STATES PATENTS

| Number | Name | Date |
|---|---|---|
| 2,101,826 | Thompson | Dec. 7, 1937 |
| 2,354,526 | Lapsley et al. | July 25, 1944 |
| 2,395,189 | Lapsley et al. | Feb. 19, 1946 |
| 2,483,841 | Peterson et al. | Oct. 9, 1949 |
| 2,518,734 | Wemp | Aug. 15, 1950 |

FOREIGN PATENTS

| Number | Country | Date |
|---|---|---|
| 353,016 | Germany | June 12, 1920 |